Aug. 16, 1938.  H. J. HORN  2,127,220

VEHICLE WHEEL

Filed July 5, 1935

INVENTOR.
HARRY J. HORN

BY Carroll R. Taber

ATTORNEY.

Patented Aug. 16, 1938

2,127,220

UNITED STATES PATENT OFFICE 2,127,220

VEHICLE WHEEL

Harry J. Horn, Lansing, Mich., assignor to Motor Wheel Corporation, Lansing, Mich., a corporation of Michigan Application July 5, 1935, Serial No. 29,821

7 Claims. (Cl. 301—37)

This invention relates generally to vehicle wheels and more specifically to the combination with a vehicle wheel of an ornamental cover therefor and novel means for attaching the cover to the wheel.

Broadly stated the invention consists in the provision of a wheel and cover adapted to be detachably connected to each other solely by means of inserting resilient projections formed integral with one of said elements into cooperating openings provided in the other element. In its preferred embodiment the invention consists in providing a cover having integral peripheral projections adapted to be sprung into resilient engagement with cooperating portions of the wheel body.

The preferred embodiment is shown in the accompanying drawing, wherein.

Figure 1:
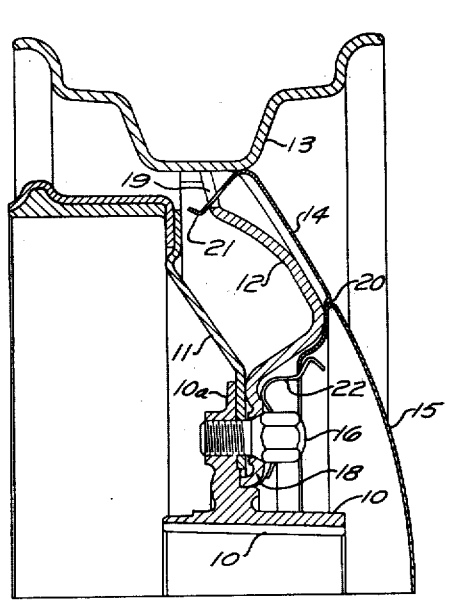
Figure 1 is a partial sectional view of a vehicle wheel having an ornamental cover and a hub cap detachably connected thereto.
Figure 2:
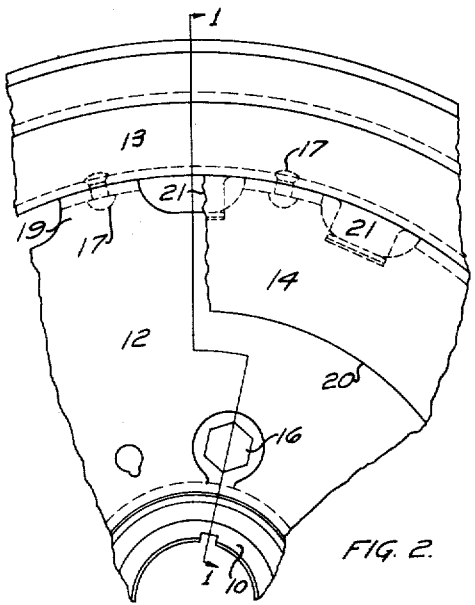
Figure 2 is a partial front view in elevation of the structure shown in Figure 1 with parts broken away.

The wheel of Figure 1 includes a hub 10, a brake drum 11, a wheel body 12, a rim 13, an ornamental cover 14 and a hub cap 15. The hub 10 is of conventional form and includes the radial attaching flange 10a to which the brake drum and wheel body are attached by means of the cap screws 16. The rim 13 is fastened to the wheel body 12 by means of rivets 17 (see Figure 2).

The bolting on portion 18 of wheel body 12, through which cap screws 16 extend, lies axially inwardly of the axially outermost portion of the wheel body. Outwardly of the bolting on flange the wheel body is provided with short stubby spoke portions 19. The space between the spokes form with the rim 13 attaching openings which cooperate with projections on the cover 14 to detachably connect the latter to the wheel body.

The cover 14 is of generally disk-like formation having a large central opening 20 affording access to the bolting on flange 18 when the cover is attached to the wheel. The cover is adapted to conceal most of the wheel body outwardly of the bolting on flange 18. At its periphery the cover is provided at spaced intervals with resilient integral projections 21 projecting axially and radially inwardly. These projections are adapted to be inserted into the openings between the spokes 19 and to resiliently engage the edge of the wheel body between the spokes. The outer extremities of projections 21 are preferably turned radially outward to facilitate springing the projections over the edge of the wheel body.

The cover 14 is preferably formed with but four of the integral projections 21, or groups of projections, equally spaced about its periphery although more or less may be used if desired. Where four equally spaced projections or groups of projections are employed, the cover may advantageously be formed from a square blank of metal. In such case the excess metal at the corners of the blank provide the necessary material for the projections. This method of forming the cover minimizes the amount of waste metal.

The hub cap 15 is attached to the wheel body 12 by means of resilient attaching clips 22 carried by bolting on flange 18. These clips are adapted to be sprung into interlocking engagement with a peripheral portion of the hub cap when the latter is pressed axially toward the wheel. Hub cap 15 is of suitable formation to conceal that portion of wheel body 12 which lies radially inward of the portion concealed by the cover 14. It will of course be apparent that cover 14 may be formed without a central opening, in which case hub cap 15 may be dispensed with entirely.

Figure 5:
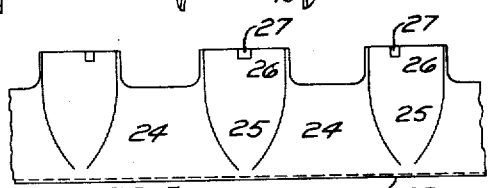
Figure 5 is a plan view of an edge portion of the cover shown in Figures 3 and 4.
Figure 4:
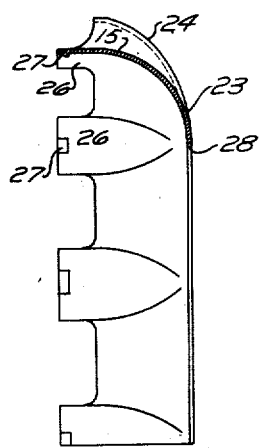
Figure 4 is a partial sectional view of the cover shown in Figure 3.
Figure 3:
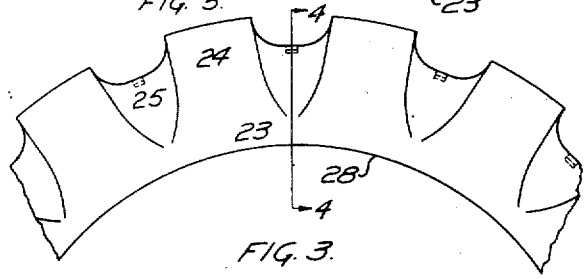
Figure 3 is a partial front view of an alternative form of ornamental cover.

The cover 23 illustrated in Figures 3, 4 and 5 is provided at its periphery with spoke-like ribs 24 separated by depressions or valleys 25. The valleys 25 include the integral axial extensions 26. These extensions are provided with small radially inwardly extending tongues or projections 27 adjacent their outer extremities. Cover 23 is also provided, as in the case of cover 14, with a large central opening 28.

In mounting cover 23 upon wheel body 12, the extensions 26 are inserted into the openings between spokes 19 and the radially outer edge of the wheel body between the spokes is engaged by the fingers 27. It will be noted that fingers 27 are formed to facilitate the installation of the cover upon the wheel body and at the same time to prevent its accidental dislodgment. The extensions 26 are sufficiently resilient to permit the removal of the cover by flexing these extensions.

The invention has been herein shown and described as applied to but one form of wheel body in combination with but two forms of covers. Those skilled in the wheel art will of course appreciate that the invention may be applied to various other combinations of wheel bodies and covers.

The scope of the invention is indicated in the appended claims.

I claim:

1. In a wheel including a wheel body, an ornamental cover for the wheel body comprising a disk-like plate having circumferentially spaced integral projections at its periphery extending axially and radially inwardly thereof, said projections adapted to be sprung into concealed resilient engagement with cooperating portions of the wheel body.

2. In a wheel including a wheel body provided with attaching openings, an ornamental cover for the wheel body comprising a disk-like plate having spaced integral projections at its periphery extending axially and radially inwardly thereof, said projections adapted to be sprung into concealed resilient engagement with the openings in the wheel body.

3. In a wheel including a wheel body having circumferentially separated spoke portions, an ornamental cover for the wheel body comprising a disk-like plate having spaced integral portions at its periphery extending axially and radially inwardly thereof, said projections adapted to be sprung into concealed resilient engagement with cooperating portions of the wheel body intermediate the spoke portions thereof.

4. In a wheel including a wheel body provided with attaching openings, an ornamental cover for the wheel body comprising a plate having radial spoke like ribs adjacent its periphery and axially extending valley portions between said ribs, said valley portions constituting attaching projections adapted to be sprung into concealed resilient engagement with the openings in the wheel body.

5. In a wheel including a wheel body having circumferentially separated spoke portions, an ornamental cover for the wheel body comprising a plate having radial spoke like ribs adjacent its periphery and axially extending valley portions between said ribs, said valley portions constituting attaching projections adapted to be sprung into concealed resilient engagement with cooperating portions of the wheel body intermediate the spoke portions thereof.

6. In a wheel including a wheel body having circumferentially spaced openings formed therein, an ornamental cover comprising a plate having radial spoke like ribs adjacent its periphery and axially extending valley portions between said ribs, said valley portions extending axially inwardly of the spoke ribs and constituting attaching elements adapted to be sprung into concealed resilient engagement with the wheel body about the openings therein, said projections including radially extending fingers at their axially inner extremities adapted to lock the projections in engaged relation to the wheel body.

7. In a wheel including a wheel body provided with attaching openings, an ornamental cover for the wheel body comprising a disk-like plate having circumferentially spaced attaching projections adjacent its periphery extending axially and radially inwardly thereof, said projections adapted to be sprung into concealed resilient engagement with the wheel body.

HARRY J. HORN.

DISCLAIMER 2,127,220.—*Harry J. Horn*, Lansing, Mich. VEHICLE WHEEL. Patent dated August 16, 1938. Disclaimer filed April 6, 1939, by the assignee. *Motor Wheel Corporation.*

Hereby enters this disclaimer to claim 7 in said specification.
[*Official Gazette May 2, 1939.*]